US008751830B2

(12) United States Patent
Muff et al.

(10) Patent No.: US 8,751,830 B2
(45) Date of Patent: *Jun. 10, 2014

(54) MEMORY ADDRESS TRANSLATION-BASED DATA ENCRYPTION/COMPRESSION

(75) Inventors: Adam J. Muff, Rochester, MN (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/355,806

(22) Filed: Jan. 23, 2012

(65) Prior Publication Data

US 2013/0191649 A1 Jul. 25, 2013

(51) Int. Cl.
*G06F 12/10* (2006.01)
*G06F 21/02* (2006.01)

(52) U.S. Cl.
USPC .......................... 713/193; 713/189; 713/190

(58) Field of Classification Search
USPC ........................................ 713/189, 190, 193
See application file for complete search history.

(56) References Cited

U.S. PATENT DOCUMENTS

| 5,852,738 | A * | 12/1998 | Bealkowski et al. ............. 712/1 |
| 7,190,284 | B1 | 3/2007 | Dye et al. |
| 7,712,098 | B2 | 5/2010 | Chauvel et al. |
| 7,822,993 | B2 | 10/2010 | Morais et al. |
| 8,135,962 | B2 | 3/2012 | Strongin et al. |
| 2006/0036650 | A1 * | 2/2006 | Ito et al. ........................... 707/200 |
| 2006/0059553 | A1 * | 3/2006 | Morais et al. .................... 726/22 |
| 2006/0095793 | A1 | 5/2006 | Hall |
| 2006/0143350 | A1 * | 6/2006 | Miloushev et al. ............ 710/242 |
| 2007/0245160 | A1 | 10/2007 | Benhase et al. |
| 2007/0283125 | A1 * | 12/2007 | Manczak et al. ................ 711/207 |
| 2008/0016327 | A1 | 1/2008 | Menon et al. |
| 2008/0077922 | A1 * | 3/2008 | Doring ............................. 718/100 |
| 2008/0155273 | A1 | 6/2008 | Conti |
| 2008/0240426 | A1 | 10/2008 | Gueron et al. |
| 2009/0031142 | A1 | 1/2009 | Halevi et al. |
| 2009/0055640 | A1 | 2/2009 | Dale et al. |

(Continued)

FOREIGN PATENT DOCUMENTS

GB 2385951 A 9/2003

OTHER PUBLICATIONS

U.S. Patent Application entitled, "Memory Address Translation-Based Data Encryption with Integrated Encryption Engine" filed by Adam J. Muff on Jan. 23, 2012.

(Continued)

*Primary Examiner* — Beemnet Dada
*Assistant Examiner* — Kalish Bell
(74) *Attorney, Agent, or Firm* — Wood, Herron & Evans LLP

(57) ABSTRACT

A method and circuit arrangement selectively stream data to an encryption or compression engine based upon encryption and/or compression-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether data is encrypted/decrypted and/or compressed/decompressed in association with handling the memory access request.

22 Claims, 11 Drawing Sheets

(56) References Cited

U.S. PATENT DOCUMENTS

| | | |
|---|---|---|
| 2009/0187734 A1 | 7/2009 | Mejdrich et al. |
| 2010/0107241 A1 | 4/2010 | Jaber et al. |
| 2010/0115250 A1* | 5/2010 | Kriegel et al. ............... 712/228 |
| 2010/0250870 A1* | 9/2010 | Vick et al. ..................... 711/154 |
| 2010/0251260 A1* | 9/2010 | May ............................. 718/108 |
| 2010/0306499 A1* | 12/2010 | Petolino, Jr. .................. 711/207 |
| 2010/0332786 A1* | 12/2010 | Grohoski et al. ............ 711/207 |
| 2010/0332850 A1 | 12/2010 | Boivie |
| 2011/0087840 A1 | 4/2011 | Glasco et al. |
| 2011/0107057 A1 | 5/2011 | Petolino, Jr. |
| 2011/0131402 A1 | 6/2011 | Mittal |
| 2012/0042126 A1 | 2/2012 | Krick et al. |

OTHER PUBLICATIONS

David Champagne et al., "Scalable Architectural Support for Trusted Software", High Performance Computer Architecture (HPCA), 2010 IEEE 16th International Symposium on HPCA, Piscataway, NJ, USA, Jan. 9, 2010, pp. 1-12.

International Search Report and Written Opinion of the ISA dated May 23, 2013—International Application No. PCT/EP2013/050022.

U.S. Patent and Trademark Office, Office Action issued in related U.S. Appl. No. 13/355,827, dated Nov. 14, 2013.

* cited by examiner

MEMORY ADDRESS TRANSLATION-BASED DATA ENCRYPTION/COMPRESSION

FIELD OF THE INVENTION

The invention is generally related to data processing, and in particular to encryption and/or compression of data stored and/or used by data processing systems and processors therein.

BACKGROUND OF THE INVENTION

Protecting secure data stored or used by the processors of a data processing system is of critical importance in many data processing applications. Encryption algorithms are typically applied to secure data to render it unintelligible without application of a decryption algorithm, and secure data is typically stored in mass storage and other non-volatile storage media in an encrypted format, requiring decryption to be performed before the secure data can be read and/or manipulated by a processor in a data processing system. However, in many instances the decryption of encrypted secure data results in the secure data being stored in an unencrypted form in various types of volatile memory in a data processing system, e.g., within a main memory or within various levels of cache memories that are used to accelerate accesses to frequently-used data. Any time that data is stored in an unsecured form in any memory of a data processing system, however, that data may be subject to unauthorized access, potentially compromising the confidential nature of the data.

Encrypting and decrypting data, however, typically requires some amount of processing overhead, and as such, even in applications where secure data is being processed, it is also desirable to retain other, non-secure data in a data processing system so that processing of that other data is not subject to the same processing overhead associated with encryption and decryption.

In addition, as semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to be performed in any given clock cycle.

Due to this increased parallelism, the challenges of maintaining secure data in a data processing system are more significant than in prior, non-parallel data processing systems. In a data processing system that only includes a single processor with a single thread, for example, secure data may be stored in an encrypted form outside of the processor, and decrypted as necessary by that single thread once the data is loaded into the processor. When additional threads, and even additional processing cores are disposed on the same processor chip, however, it may be necessary to limit access to secure data to only certain threads or processing cores on the chip. Thus, for example, if multiple threads or processing cores share a common cache memory, storing any secure data in an unencrypted form in that cache memory may present a risk that an unauthorized party may obtain access to that data via a thread or processing core other than that which is authorized to access the secure data. Furthermore, as modern system on chip (SOC) processor designs grow to hundreds of processing cores on a processor chip, it becomes increasingly important to protect unencrypted data from even other processes on the same processor chip.

Conventionally, encryption and decryption have been handled by software executing on a processor. Encryption and decryption, however, are processor intensive tasks, and as a result, dedicated hardware-based encryption engines have been developed to perform encryption/decryption of secure data in a faster and more efficient manner than can typically be achieved by software, thereby reducing the overhead associated with such operations. Conventional encryption engines are typically disposed external from a processing core, e.g., between the processing core and a memory controller, or otherwise coupled to a memory bus that is external from any processing core. Furthermore, to facilitate determining what data is and is not encrypted, secure data may be stored in specific memory address regions, such that filtering may be used to control an encryption engine to encrypt/decrypt only data that is stored in identified ranges of memory addresses.

Such an architecture, however, can lead to unencrypted data existing in caches and being accessible by other threads and/or processing cores in a chip. Furthermore, a memory controller, resident outside of a processor chip, is typically required to establish and manage ranges of memory addresses in which secure data is stored so that an encryption can be selectively activated for memory transactions involving secure data, resulting in inefficient throughput for secure data.

Similar challenges also exist with respect to data compression. Data compression may be used to reduce the amount of memory required to store data; however, compressed data must be decompressed prior to use by a processing core or thread. Compression and decompression of data involves processing overhead, and as such, implementing such functions in software often comes with a performance penalty. Furthermore, dedicated compression engines have also be developed to reduce the processing overhead associating with compressing and decompressing data; however, such engines are typically disposed external to a processing core, e.g., within a memory controller, and as a result, compressed data may be required to be stored in various levels of cache memory in a decompressed format, which limits the amount of room for storing other data in such cache memories, thereby reducing memory system performance. In addition, as with encrypted data, a memory controller may be required to establish and manage ranges of memory addresses in which compressed data is stored so that a compression engine can be selectively activated for memory transactions involving compressed data, resulting in inefficient throughput for compressed data.

Therefore, a significant need continues to exist in the art for a manner of minimizing the performance overhead associated with accessing and managing encrypted and/or compressed data in a data processing system, as well as providing further protection of encrypted data within a multithreaded and/or multi-core processor chip and a data processing system incorporating the same.

SUMMARY OF THE INVENTION

The invention addresses these and other problems associated with the prior art by providing a method and circuit arrangement that selectively stream data to an encryption or compression engine based upon encryption and/or compression-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether data is encrypted/decrypted and/or compressed/decompressed in association with handling the memory access request.

Therefore, consistent with one aspect of the invention, a memory address translation data structure is accessed, in response to a memory access request initiated by a thread in a processing core, to perform a memory address translation for the memory access request. In addition, an encryption-related page attribute in the memory address translation data structure is accessed to determine whether the memory page associated with the memory access request is encrypted. Secure data in the memory page is then selectively streamed through an encryption engine to perform an encryption operation on the secure data based upon whether the memory page associated with the memory access request is determined to be encrypted.

Consistent with another aspect of the invention, a memory address translation data structure is accessed, in response to a memory access request initiated by a thread in a processing core, to perform a memory address translation for the memory access request. In addition, a compression-related page attribute in the memory address translation data structure is accessed to determine whether the memory page associated with the memory access request is compressed. Data in the memory page is then selectively streamed through a compression engine to perform a compression operation on the data based upon whether the memory page associated with the memory access request is determined to be compressed.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention selectively stream data to an encryption or compression engine based upon encryption and/or compression-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether data is encrypted/decrypted and/or compressed/decompressed in association with handling the memory access request.

In addition, in some embodiments consistent with the invention, an integrated encryption engine may be utilized within a processing core of a multi-core processor to perform encryption operations, i.e., encryption and decryption of secure data, in connection with memory access requests that access such data. When combined with a memory address translation data structure such as an Effective To Real Translation (ERAT) or Translation Lookaside Buffer (TLB) that has been augmented with encryption-related page attributes to indicate whether pages of memory identified in the data structure are encrypted, secure data associated with a memory access request in the processing core may be selectively streamed to the integrated encryption engine based upon the encryption-related page attribute for the memory page associated with the memory access request. In addition, in some embodiments, an integrated encryption engine may be coupled to an L1 cache in the processing core that is effectively secure from the standpoint that it stores secure data. The L1 cache may be configured to store both secure and non-secure data, or alternatively, the L1 cache may be designated for secure data, and a second, non-secure L1 cache may be used to cache non-secure data. In either instance, secure data may be decrypted only within the processing core, and encrypted any time the secure data is resident outside of the processing core, thereby providing enhanced security over conventional designs.

Other variations and modifications will be apparent to one of ordinary skill in the art. Therefore, the invention is not limited to the specific implementations discussed herein.

Hardware and Software Environment

Figure 1:
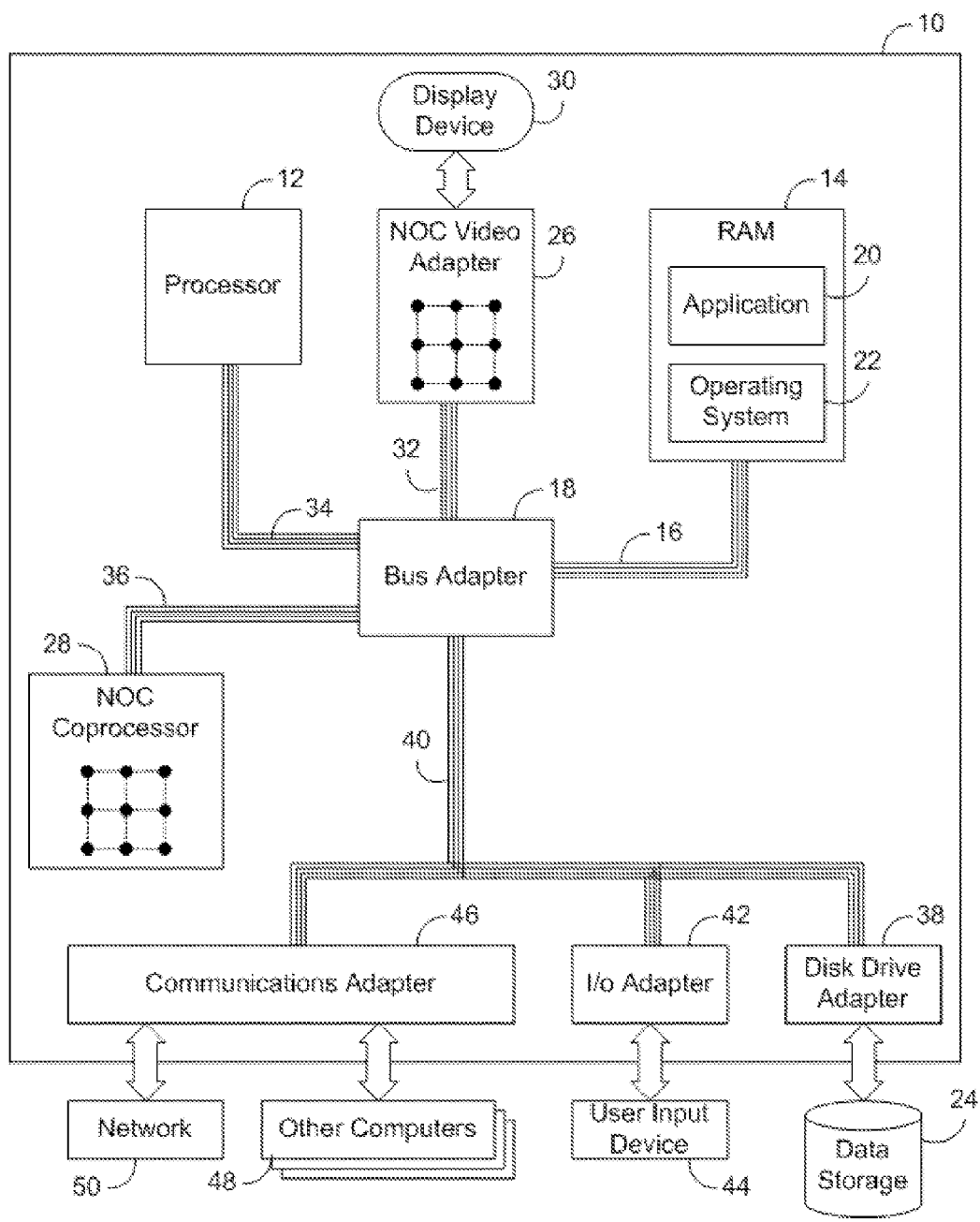
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
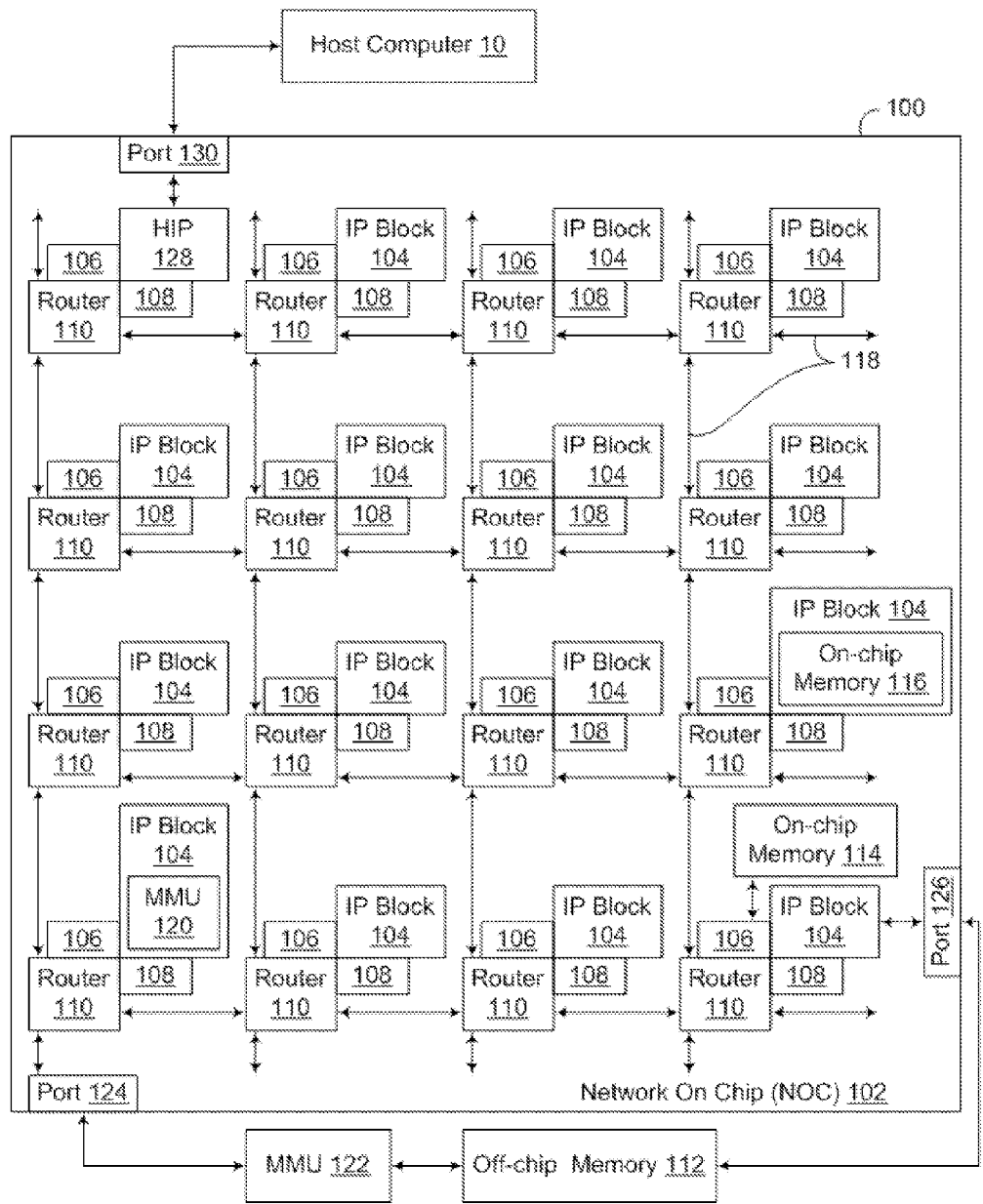
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
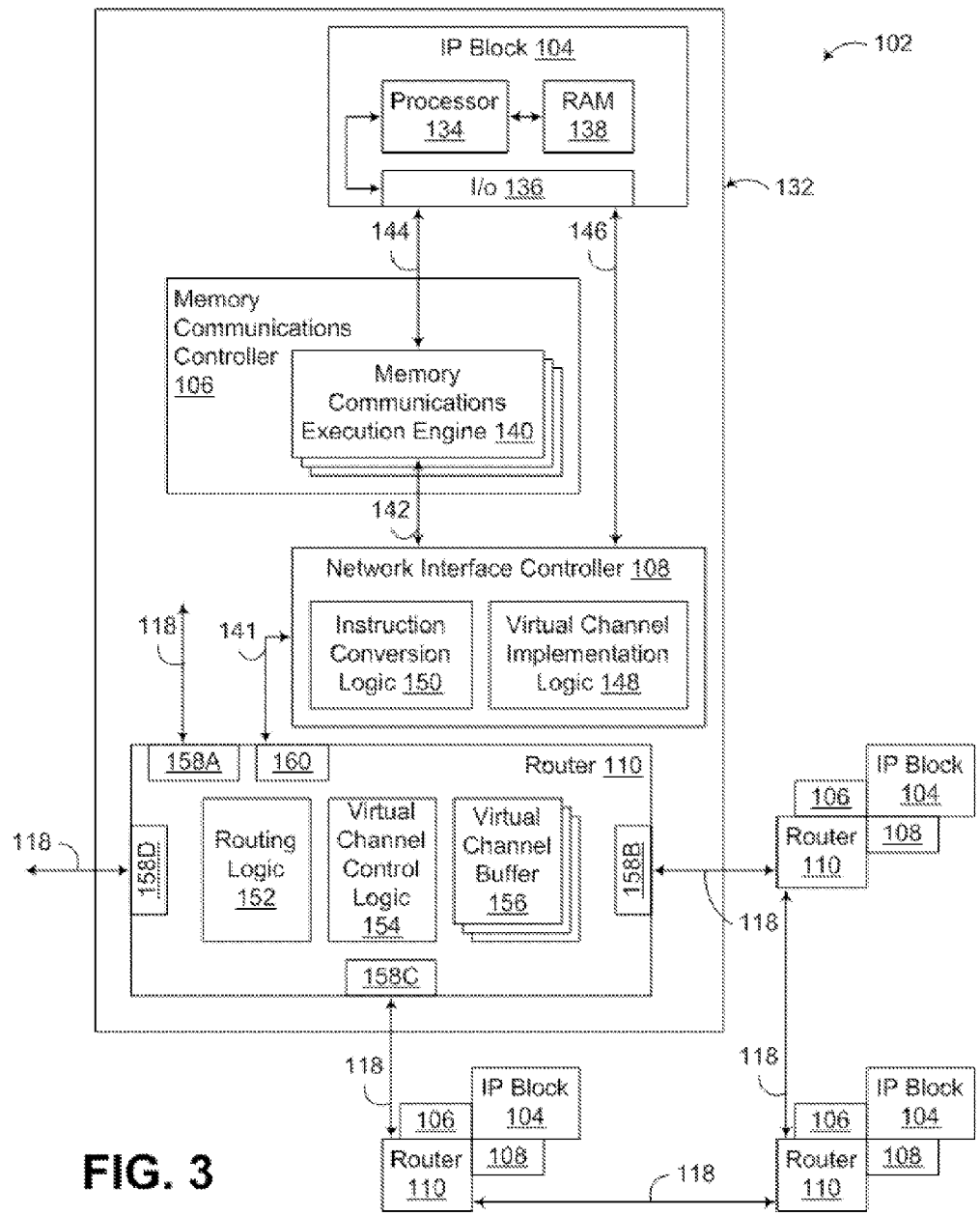
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 1588 and 158D are termed horizontal ports.

Figure 4:
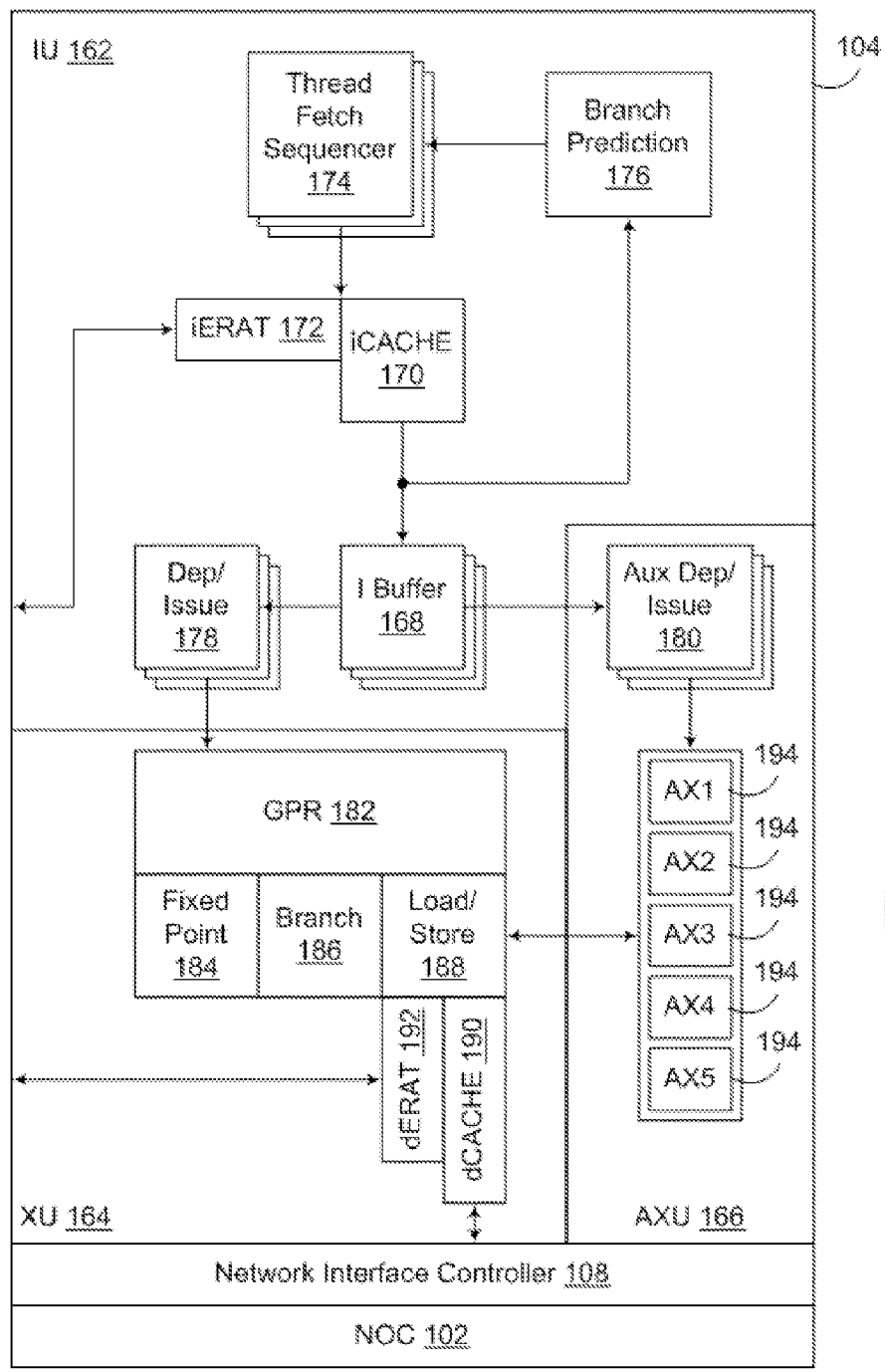
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Memory Address Translation-Based Data Encryption/Compression

Protecting unencrypted secure data from being accessed outside of a secure thread is of paramount importance in many data processing applications. Generally this data is only kept secure outside of a chip, but as SOCs grow to hundreds of processors on a chip, it is increasingly important to protect unencrypted data from even other processes on the same chip. Conventionally, certain address ranges identified for encryption are filtered and encrypted/unencrypted as the data is passed to/from a memory controller. However, this can lead to unencrypted data existing in caches and being accessible by other threads.

Encryption-related embodiments consistent with the invention, on the other hand, enable the protection of pages of memory to only authorized threads by adding one or more encryption-related page attributes to the memory address translation data structures that are used to perform memory address translation between virtual and real memory addresses. In one embodiment, for example, one or more encryption-related page attributes may be added to the page table entries (PTEs) of an Effective To Real Translation (ERAT) table of a processing core, so that only secured threads that have permission to access a page of memory, as specified by the PTE for that page, will be permitted to access the page. If another thread attempts to access this page then a security interrupt will be raised and handled in a desired manner by a hypervisor or other supervisor-level software. Furthermore, the page attribute is further used to simplify hardware encryption/decryption by identifying the memory accesses that need to be sent to an encryption engine. This page attribute may be sent, for example, to an L2 cache or other lower level memory in response to a miss on an L1 cache as an indication that the reload data must stream through the encryption engine on loads or stores in order to decrypt/encrypt the data as appropriate.

By incorporating an encryption-related page attribute into the memory address translation functionality of a processor, the security of secure data throughout a data processing system is enhanced with reduced impact on performance, particularly in an SOC with many SMT processing cores. In addition, in many instances PTEs are not tied to particular process identifiers, so different processes may be authorized to access the same encrypted data in some embodiments of the invention.

Likewise, with respect to data that is compressed in a data processing system, conventional data processing systems control compressed memory regions using a series of registers to configure memory ranges, which often requires additional hardware, and complex software configuration, both of which can have adverse impacts on system performance.

Compression-related embodiments consistent with the invention, on the other hand, add one or more compression-related page attributes to the memory address translation data structures that are used to perform memory address translation between virtual and real memory addresses to simplify the compression/decompression process and reduce the latency associated with accessing compressed data. In one embodiment, for example, one or more compression-related page attributes may be added to the page table entries (PTEs) of an Effective To Real Translation (ERAT) table of a processing core, so that when a PTE is initialized for a memory page that includes compressed data, a corresponding compression-related page attribute can be forwarded to the memory subsystem when a load is executed so that the data from memory, or the higher level cache, will stream directly through a hardware compression engine to be decrypted. The reverse also holds, that any store data will stream though the compression engine before being sent to the first level of compressed storage. This simplifies the process of managing compressed data, and reduces the amount of support hardware and performance overhead associated with managing the compressed data.

In addition, in some embodiments consistent with the invention, page attributes may include level attributes that may be used to configure pages to be selectively encrypted and/or compressed in various levels of a memory system, e.g., in a main memory or in higher level caches like L1, L2 or L3 caches. Thus, for example, some pages can be encrypted/compressed in L2 or L3 caches, while other pages can be encrypted/compressed in memory, but unencrypted/uncompressed in L2 or L3 caches. This provides more flexibility and can increase performance, particularly when it is desirable to accelerate memory access performance for frequently accessed data that is retained in higher levels of a memory system. Among other benefits, compression as implemented herein can effectively increase the size of a cache without requiring a corresponding increase in memory bandwidth.

Figure 5:
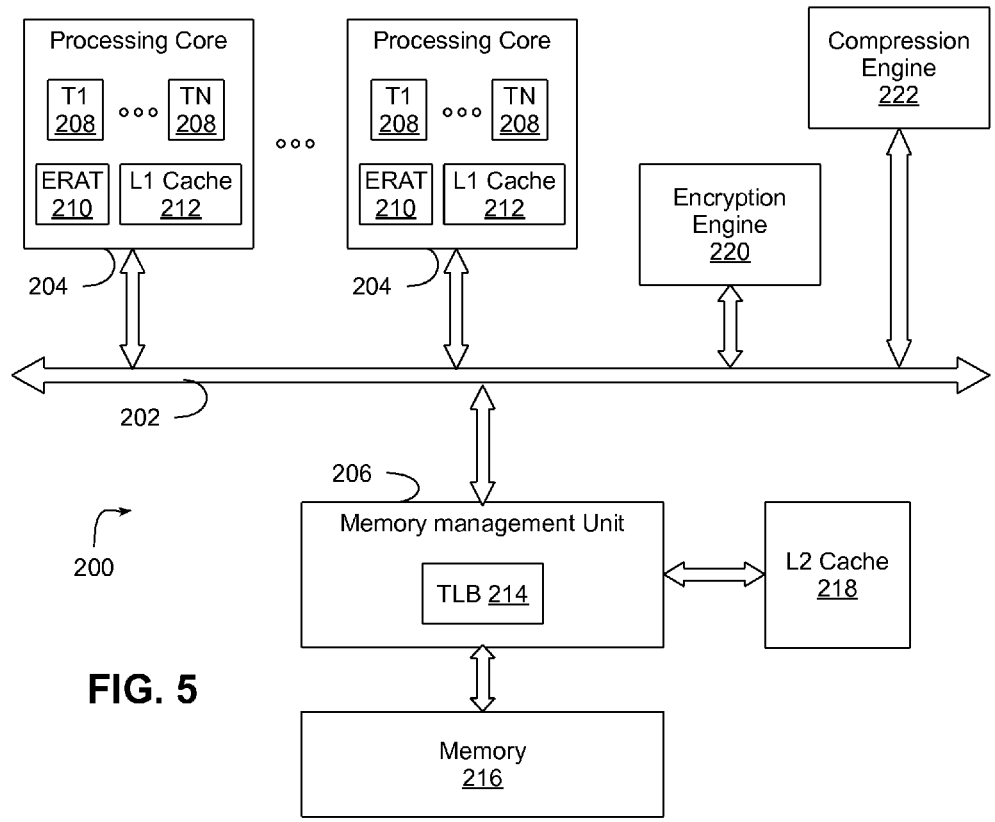
FIG. 5 is a block diagram of an exemplary data processing system incorporating memory address translation-based data encryption/compression consistent with the invention.

FIG. 5, for example, illustrates an exemplary data processing system 200 suitable for implementing memory address translation-based data encryption/compression consistent with the invention. System 200 is illustrated with a memory bus 202 coupling together a plurality of processing cores 204 to a memory management unit (MMU) 206. While only two processing cores 204 are illustrated in FIG. 5, it will be appreciated that any number of processing cores may be utilized in different embodiments of the invention.

Each processing core 204 is an SMT core including a plurality (N) of hardware threads 208, along with an Effective To Real Translation (ERAT) table 210 and integrated L1 cache 212. ERAT table 210, as is understood in the art, serves as a cache for memory address translation data, e.g., PTEs, and is typically associated with a lower level data structure, e.g., a translation lookaside buffer (TLB) 214 disposed in or otherwise accessible to MMU 206. TLB 214 may also serve as a cache for a larger page table, which is typically stored in a memory 216.

The memory system may include multiple levels of memory and caches, and as such, data processing system 200 is illustrated including an L2 cache 218 coupled to MMU 206 and shared by processing cores 204. It will be appreciated, however, that various alternative memory architectures may be utilized in other embodiments of the invention. For example, additional levels of cache memory, e.g., L3 caches, may be used, and memory 216 may be partitioned in some embodiments, e.g., in Non-Uniform Memory Access (NUMA)-based data processing systems. Furthermore, additional cache levels may be dedicated to particular processing cores, e.g., so that each processing core includes a dedicated L2 cache, which may be integrated into the processing core or coupled between the processing core and the memory bus. In some embodiments, an L2 or L3 cache may be coupled directly to the memory bus, rather than via a dedicated interface to an MMU.

In addition, it will be appreciated that the components illustrated in FIG. 5 may be integrated onto the same integrated circuit device, or chip, or may be disposed in multiple such chips. In one embodiment, for example, each processing core is implemented as an IP block in a NOC arrangement, and bus 202, MMU 206 and L2 cache 218 are integrated onto the same chip as the processing cores in a SOC arrangement. In other embodiments, bus 202, MMU 206, L2 cache 218, and/or memory 216 each may be integrated on the same chip or in different chips from the processing cores, and in some instances processing cores may be disposed on separate chips.

Given the wide variety of known processor and memory architectures with which the invention may be utilized, it will therefore be appreciated that the invention is not limited to the particular memory architecture illustrated herein.

To implement memory address translation-based data encryption/compression consistent with the invention, data processing system 200 includes an encryption engine 220 and compression engine 222 coupled to bus 202 and thus accessible for encrypting/decrypting and compressing/decompressing data communicated over bus 202. While engines 220 and 222 are respectively referred to as encryption and compression engines, it will be appreciated that engine 220 typically includes both encryption and decryption logic, and that engine 222 typically includes both compression and decompression logic, irrespective of the names therefor used herein. It will be appreciated that in some embodiments encryption and decryption logic may be disposed in separate "engines," as may compression and decompression logic. However, for the purposes of the invention, an encryption engine may be considered to be any collection of hardware logic capable of performing encryption and/or decryption of data, and that a compression engine may be considered to be any collection of hardware logic capable of performing compression and/or decompression of data.

For the purposes of facilitating a discussion of the invention, data processing system 200 is described as including both encryption and compression functionality. However, in many embodiments it may be desirable to support only encryption or only compression functionality, and as such, embodiments consistent with the invention are not required to support both data encryption and data compression. Thus, either engine 220, 222 may be omitted in some embodiments, and the page attributes that are used to indicate whether a page of memory is encrypted or compressed may only include encryption-related attributes or compression-related attributes in some embodiments. Moreover, while engines 220, 222 are illustrated as attached to bus 202, either or both of engines 220, 222 may be coupled to MMU 206 or integrated therein.

Figure 6:
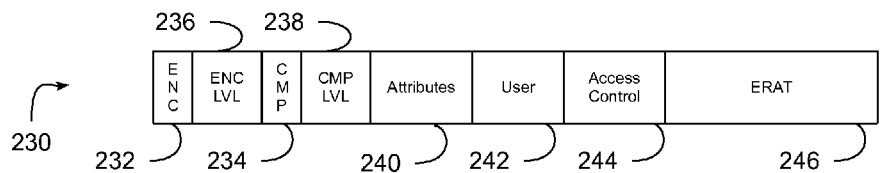
FIG. 6 is a block diagram of an exemplary ERAT entry format for the ERAT referenced in FIG. 5.

As noted above, memory address translation-based data encryption/compression may be implemented by adding one or more page attributes to a memory address translation data structure, e.g., a page table entry (PTE). FIG. 6, for example, illustrates an exemplary PTE 230 capable of being maintained in an ERAT 210, and extended to include various page attributes 232-238 to support memory address translation-based data encryption/compression. For encryption, an encrypted attribute 232, e.g., a one-bit flag, may be used to indicate whether the data in the page is encrypted. Likewise, for compression, a compressed attribute 234, e.g., a one-bit flag, may be used to indicate whether the data in the page is compressed.

In addition, in some embodiments it may be desirable to optionally specify a level at which the data is encrypted and/or compressed in a page, such that the data will be unencrypted/uncompressed at any higher level in the memory architecture (or optionally, at the specified level), and the data will be encrypted/compressed at the specified level and any lower levels in the memory architecture. For example, a two-bit level attribute, e.g., level attribute 236 for encryption and level attribute 238 for compression, may be provided to encode up to four memory levels, e.g., L1="00", L2="01", L3="10" and memory="11." Alternatively, each memory level may have a separate one-bit flag associated therewith. Moreover, in some embodiments the encrypted and/or compressed attributes 232, 234 may be merged with the associated level attributes. For example, if no L3 cache is supported, one of the four states encoded in a two-bit level attribute (e.g., "00") may represent that the page is unencrypted or uncompressed.

PTE 230 also stores additional data, similar to conventional PTEs. For example, additional page attributes 240 such as attributes indicating whether a page is cacheable, guarded, or read-only, whether memory coherence or write-through is required, an endian mode bit, etc., may be included in a PTE, as may one or more bits allocated to user mode data 242, e.g., for software coherency or control over cache locking options. An access control page attribute 244 is provided to control what processes are permitted to access a page of memory, e.g., by specifying a process identifier (PID) associated with the process that is authorized to access the page, or optionally a combination of match and/or mask data, or other data suitable for specifying a set of processes that are authorized to access a page of memory. For example, the access control attribute may mask off one or more LSBs from a PID so that any PID matching the MSBs in the access control attribute will be permitted to access the corresponding memory page. ERAT page attribute 246 stores the effective to real translation data for the PTE, typically including the real address corresponding the effective/virtual address that is used to access the PTE, as well as the effective/virtual address, which is also used to index the ERAT via a CAM function.

It will be appreciated that the format of PTE 230 may also be used in TLB 214 and any other page table resident in the memory architecture. Alternatively, the PTEs stored in different levels of the memory architecture may include other data or omit some data based upon the needs of that particular level of the memory architecture. Furthermore, it will be appreciated that, while the embodiments discussed herein utilize the terms ERAT and TLB to describe various hardware logic that stores or caches memory address translation information in a processor or processing core, such hardware logic may be referred to by other nomenclature, so the invention is not limited to use with ERATs and TLBs. In addition, other PTE formats may be used and therefore the invention is not limited to the particular PTE format illustrated in FIG. 6.

By storing encryption-related and compression-related attributes in a PTE, the determination of whether a page is encrypted and/or compressed, and the actual decryption and decompression of such data, is restricted to only those processes, and hardware threads executing on their behalf, that are authorized by the functionality in the data processing system that otherwise controls access to the pages themselves. Page-based access control, which is conventionally used to prevent processes executing in a data processing system from accessing or corrupting the memory of other processes resident in a data processing system, may therefore be extended to support the management of encrypted and/or compressed data stored therein.

As is well known in the art, a hypervisor or other supervisor-level software, e.g., running in firmware, a kernel, a partition manager or an operating system, is conventionally used to allocate memory pages to particular processes and to handle access violations that might otherwise occur if a process attempts to access a memory page for which it is not authorized to access. Such supervisor-level software, for example, may manage an overall page table for the data processing system, with dedicated hardware in the data processing system used to cache PTEs from a page table in TLB 214 and ERATs 210. Embodiments consistent with the invention are therefore able to leverage existing supervisor-level access controls to limit access to encrypted and/or compressed data. In many instances, for example, a process may not even be able to determine whether a page of memory is encrypted or compressed because access to the PTE is restricted by the supervisor-level software. Thus, for example, if no process executing on one processing core is authorized to access a page of memory that has been allocated to a process on another processing core, no process in the former processing core will even be allowed to retrieve data from that page of memory, even in encrypted or compressed form.

Figure 7:
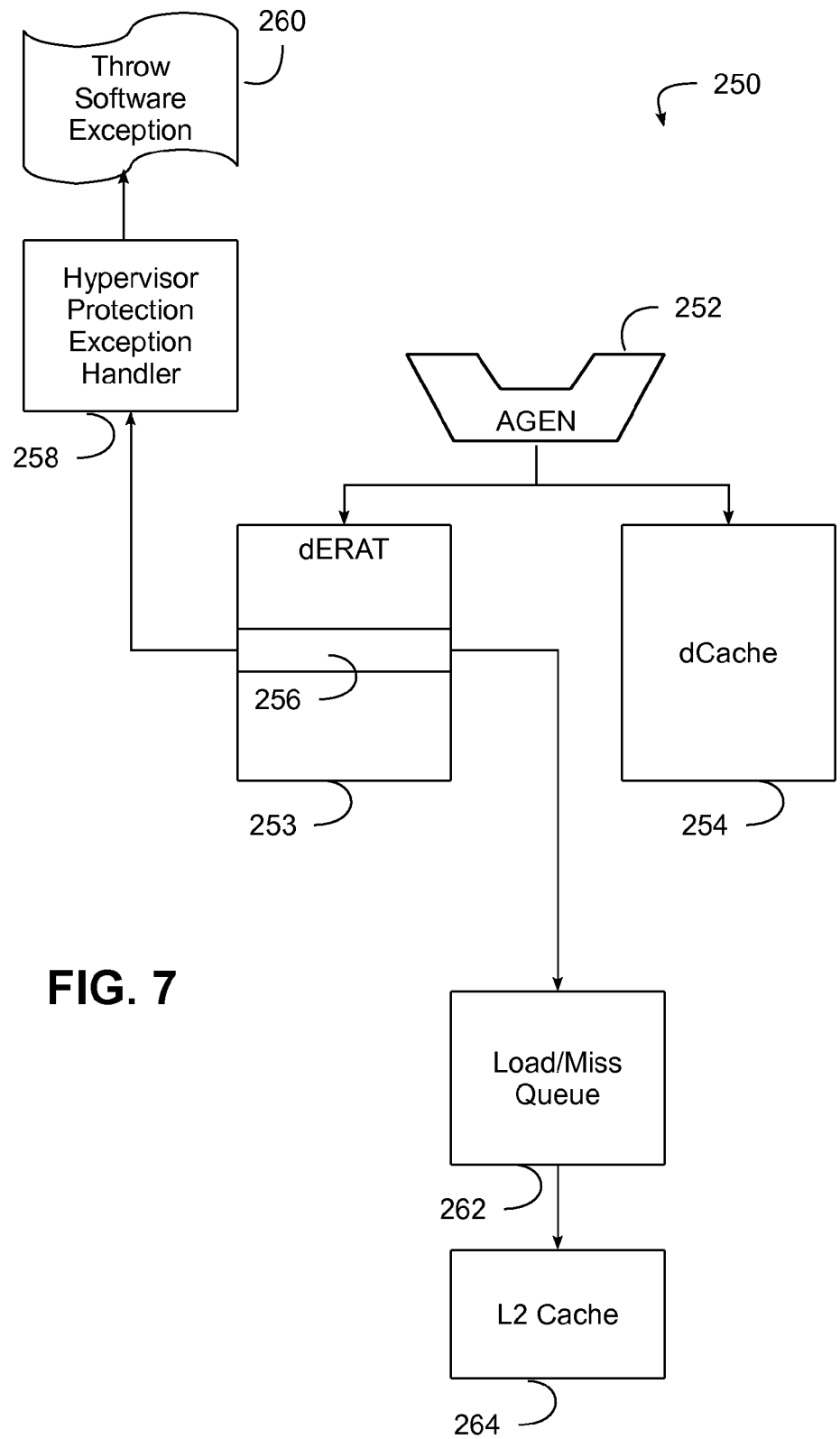
FIG. 7 is a block diagram illustrating an exemplary memory access using a data processing system supporting memory address translation-based data encryption/compression consistent with the invention.

FIG. 7 for example, illustrates an exemplary data processing system 250, and in particular, an exemplary processing core therein, for the purposes of illustrating an exemplary memory access that utilizes memory address translation-based data encryption/compression consistent with the invention. Address generation logic 252, e.g., as provided in a load/store unit of a processing core, may generate a memory access request to access data (e.g., a cache line) from a particular page of memory, e.g., in response to an instruction executed by a hardware thread (not shown) executing in the processing core. The memory access request is issued to both an ERAT 253 and an L1 cache 254 in parallel, with the former performing an address translation operation, along with determining whether the memory access request is authorized for the PID with which the requesting hardware thread is associated, and with the latter determining whether the cache line specified by the memory access request is currently cached in the L1 cache. In the illustrated embodiment of FIG. 7, ERAT 253 is designated a "dERAT" and L1 cache 254 is designated a "dCache" to indicate that these components are associated with data accesses, and that corresponding iERAT and iCache components may be provided to handle instruction accesses (not shown).

ERAT 253, in response to the memory access request, accesses a PTE 256 for the page of memory specified by the memory access request. Hypervisor protection exception handler logic 258 compares a PID for the memory access request with the access control bits in the PTE, and if an access violation occurs as a result of the PID not being authorized to access this page of memory, logic 258 signals an interrupt by throwing a software exception to the supervisor-level software, as represented at 260. In the event that a memory access request is authorized but a miss occurs on the L1 cache, the memory access request is forwarded to a load/miss queue 262, which issues the request to a lower level of memory, e.g., an L2 cache 264.

Figure 8:
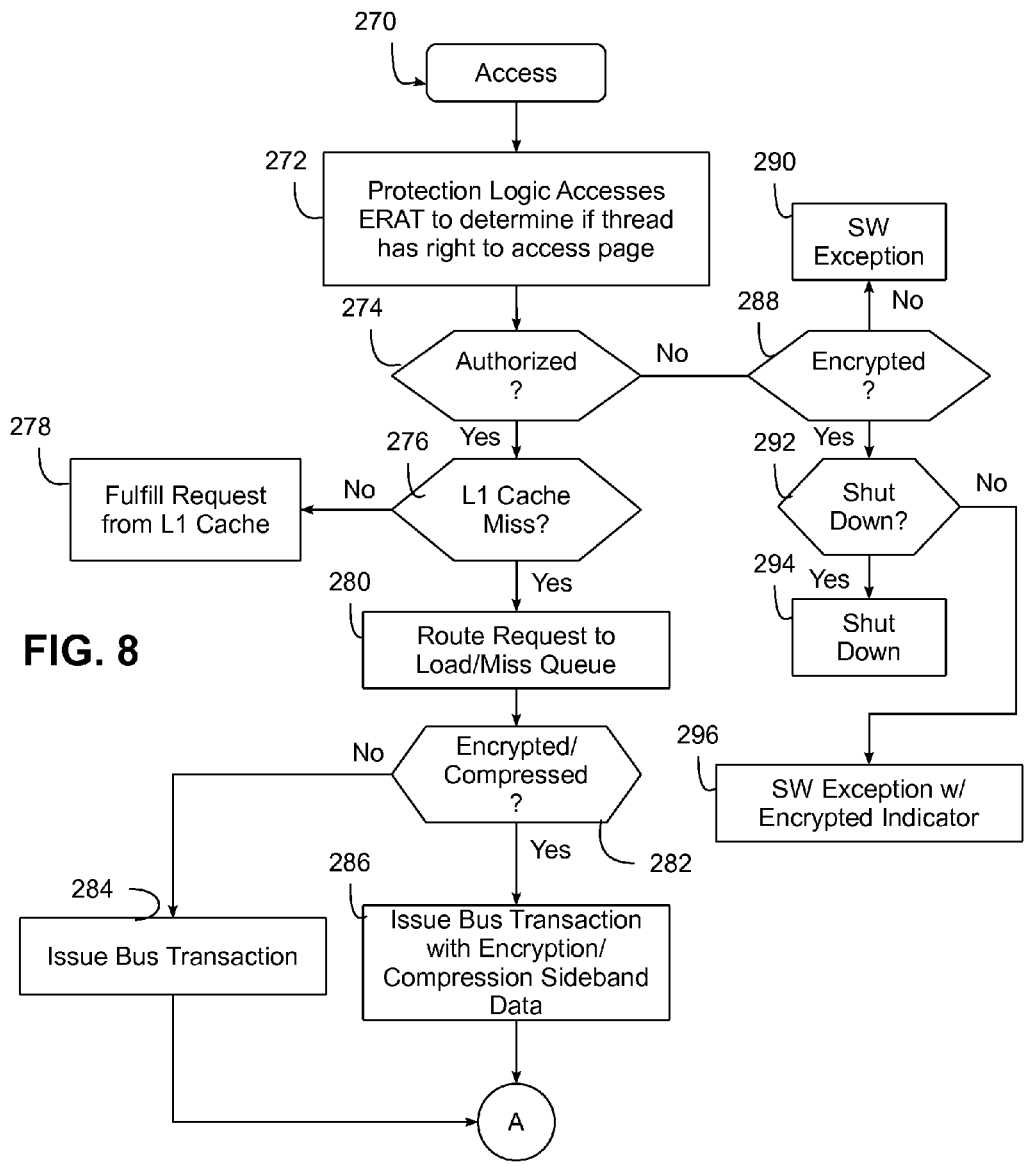
FIG. 8 is a flowchart illustrating an exemplary sequence of operations for accessing data in the data processing system of FIG. 7.

FIG. 8 illustrates in greater detail a sequence of operations 270 that may be performed in response to a memory access requests issued by a hardware thread on behalf of a process in data processing system 250. Protection logic, e.g., handler logic 258, accesses ERAT 253 to determine if PTE 256 indicates that the requesting thread has the right to access the page associated with the memory access request (block 272). If authorized (block 274), a determination is made as to whether the request can be fulfilled by L1 cache 254 (block 276). If the memory access request does not miss on L1 cache 254, the request is fulfilled by L1 cache 254 (block 278), and handling of the memory access request is complete.

However, if the request misses on L1 cache 254, the request is routed to load/miss queue 262 to add an entry in the queue corresponding to the request. In addition, it may be desirable to set an indicator in the entry to indicate that the request is associated with data that is encrypted and/or compressed. Next, prior to issuing the request to a lower level memory, e.g., over a memory bus to either an L2 cache or a lower level memory, a determination is made in block 282 as to whether the page is indicated to be encrypted and/or compressed, as determined from the page attributes in PTE 256. If not, a bus transaction is issued for the memory access request in block 284. On the other hand, if the page is encrypted and/or compressed, a bus transaction is issued in block 286 with additional encryption/compression-related sideband data from PTE 256.

The encryption/compression-related sideband data may be communicated over a memory bus in a number of manners consistent with the invention. For example, additional control lines may be provided in a bus architecture to specify whether a bus transaction is associated with encrypted and/or compressed data so that a determination of whether data is encrypted or compressed may be determined based upon the state of one or more control lines. Alternatively, transaction types may be associated with encrypted and/or compressed data so that a determination may be made simply based upon the transaction type of the bus transaction. In the latter instance in particular, an encryption engine or a compression engine would not be required to snoop for particular memory ranges, but could instead merely look for certain transaction types.

Returning to block 274, in the event that the requesting thread is not authorized to access the requested page, control passes to block 288 to handle the access violation. In contrast to conventional access violation handling, it may be desirable in some embodiments to perform alternate or enhanced operations for access violations associated with encrypted data to reflect the additional concerns associated with unauthorized access attempts to secure data. Thus, upon detecting an access violation, block 288 determines whether the page is encrypted by accessing the encryption-related page attribute for the page. If not encrypted, a software exception is asserted (block 290) and handled in a conventional manner. If, on the other hand, the page is encrypted, control passes to block 292 to determine whether to shut down the data processing system. In some high security embodiments, e.g., where highly classified information is potentially maintained in a data processing system, it may be desirable immediately shut down a system in the event of a potential attack. Thus, it may be desirable to provide a configurable mode where an access violation results in an immediate system shutdown. Thus, if the configurable mode is set, block 292 passes control to block 294 to shut down the system. Otherwise, block 292 passes control to block 296 to assert a software exception similar to a conventional exception, except with an indicator that the page for which the exception is being signaled was encrypted. Software, e.g., a kernel or other supervisor-level program, may then perform enhanced exception handling such as logging an attempt to access an encrypted page, notifying a central processor, sending messages across a network to an external facility, wiping memory and state contents, or any other operations that may be desired based upon the security requirements for the data and/or data processing system.

Figure 9:
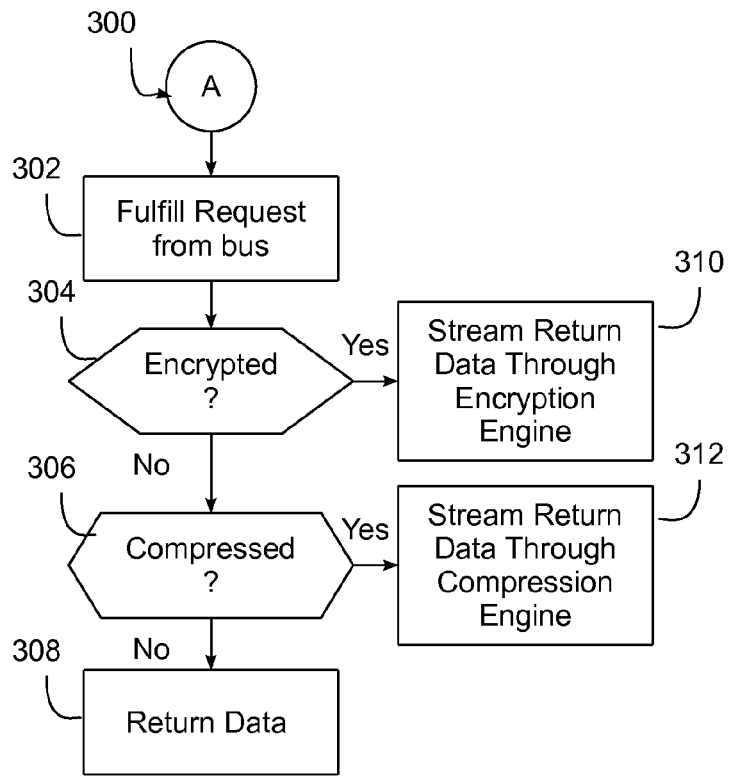
FIG. 9 is a flowchart illustrating an exemplary sequence of operations for performing a read bus transaction in the data processing system of FIG. 7.
Figure 10:
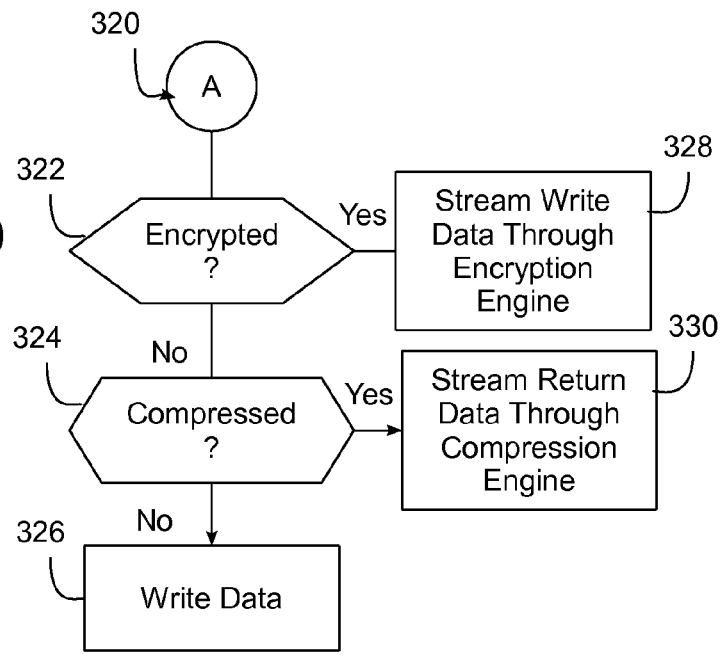
FIG. 10 is a flowchart illustrating an exemplary sequence of operations for performing a write bus transaction in the data processing system of FIG. 7.

FIGS. 9 and 10 next respectively illustrate sequences of operations associated with performing read and write bus transactions issued in response to the memory access request discussed above in connection with FIG. 8. FIG. 9, for example, illustrates a sequence of operations 300 for handling a read bus transaction. The read bus transaction initially results in the request being fulfilled by the bus (block 302), e.g., by an L2 or L3 cache if the data is already cached, or from the memory if not. Next, determinations are made if the transaction indicates that the data is encrypted (block 304) or compressed (block 306), e.g., by encryption and compression engines respectively snooping the bus for a transaction type associated with encrypted or compressed transactions, or for asserted control lines on the bus.

If the data is not encrypted or compressed, the data is returned in a conventional manner (block 308). If, however, the data is encrypted, the return data is streamed through an encryption engine (e.g., encryption engine 220 of FIG. 5) to decrypt the data prior to returning the data to the requesting processing core (block 310). Likewise, if the data is compressed, the return data is streamed through a compression engine (e.g., compression engine 222 of FIG. 5) prior to returning the data to the requesting processing core (block 312).

As shown in FIG. 10, a write bus transaction is handled in a similar manner to a read bus transaction, via sequence of operations 320. The write bus transaction includes a cache line to be written to a lower level of memory; however, prior to forwarding the data to an appropriate destination, e.g., by an L2 or L3 cache or the main memory, determinations are made if the transaction indicates that the data is encrypted (block 322) or compressed (block 324), e.g., by encryption and compression engines respectively snooping the bus for a transaction type associated with encrypted or compressed transactions, or for asserted control lines on the bus.

If the data is not encrypted or compressed, the data is written to the appropriate destination in a conventional manner (block 326). If, however, the data is encrypted, the write data is first streamed through an encryption engine (e.g., encryption engine 220 of FIG. 5) to encrypt the data prior to writing the data (block 328). Likewise, if the data is compressed, the write data is first streamed through a compression engine (e.g., compression engine 222 of FIG. 5) prior to writing the data (block 330).

Figure 11:
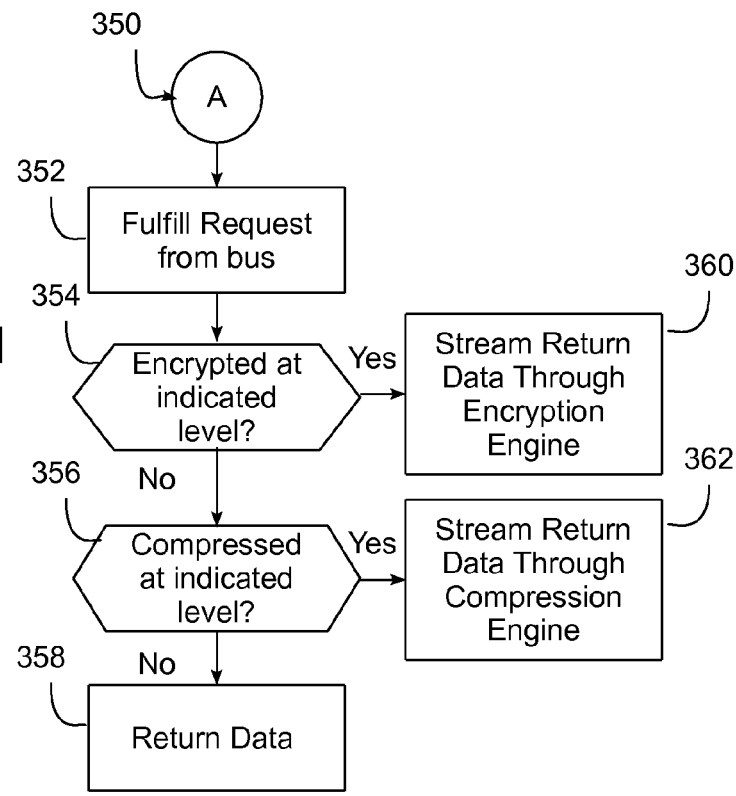
FIG. 11 is a flowchart illustrating an alternate sequence of operations for performing a read bus transaction in the data processing system of FIG. 7 in connection with level-selective encryption/compression.
Figure 12:
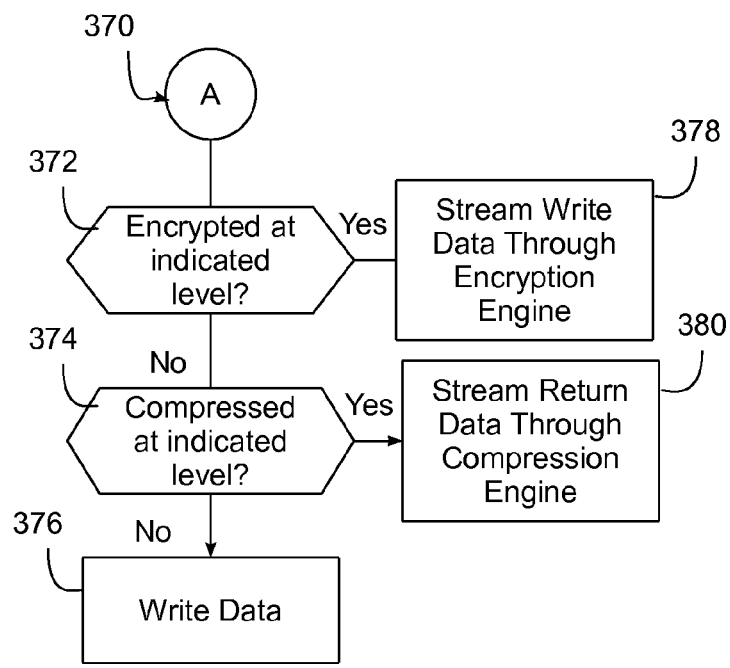
FIG. 12 is a flowchart illustrating an alternate sequence of operations for performing a write bus transaction in the data processing system of FIG. 7 in connection with level-selective encryption/compression.

FIGS. 11 and 12 next respectively illustrate sequences of operations associated with performing read and write bus transactions issued in response to the memory access request discussed above in connection with FIG. 8, but for an implementation in which level attributes are supported in a PTE to control in which levels in a multi-level memory architecture a page of memory is encrypted/compressed.

FIG. 11, for example, illustrates a sequence of operations 350 for handling a read bus transaction. The read bus transaction initially results in the request being fulfilled by the bus (block 352), e.g., by an L2 or L3 cache if the data is already cached, or from the memory if not. Next, determinations are made if the transaction indicates that the data is encrypted (block 354) or compressed (block 356) at the level of the memory architecture from which the data is being sourced, e.g., by encryption and compression engines respectively snooping the bus for a transaction type associated with encrypted or compressed transactions, or for asserted control lines on the bus. In the illustrated embodiment, requested data will be encrypted or compressed if the level attribute associated therewith is equal to or higher than the level of memory from which the data is being sourced (e.g., if the level attribute indicates the L2 cache, the data will be encrypted/compressed in the L2 cache, in any L3 or lower level cache, and the main memory).

If the data is not encrypted or compressed at the level from which the data is being sourced, the data is returned in a conventional manner (block 358). If, however, the data is encrypted at the sourcing level, the return data is streamed through an encryption engine (e.g., encryption engine 220 of FIG. 5) to decrypt the data prior to returning the data to the requesting processing core (block 360). Likewise, if the data is compressed at the sourcing level, the return data is streamed through a compression engine (e.g., compression engine 222 of FIG. 5) prior to returning the data to the requesting processing core (block 362).

As shown in FIG. 12, a write bus transaction is handled in a similar manner to a read bus transaction, via sequence of operations 370. The write bus transaction includes a cache line to be written to a lower level of memory; however, prior to forwarding the data to an appropriate destination, e.g., by an L2 or L3 cache or the main memory, determinations are made if the transaction indicates that the data is encrypted (block 372) or compressed (block 374) at the destination level of the transaction, e.g., by encryption and compression engines respectively snooping the bus for a transaction type associated with encrypted or compressed transactions, or for asserted control lines on the bus.

If the data is not encrypted or compressed at the destination level, the data is written to the appropriate destination in a conventional manner (block 376). If, however, the data is encrypted at the destination level, the write data is first streamed through an encryption engine (e.g., encryption engine 220 of FIG. 5) to encrypt the data prior to writing the data (block 378). Likewise, if the data is compressed at the destination level, the write data is first streamed through a compression engine (e.g., compression engine 222 of FIG. 5) prior to writing the data (block 380).

Thus, in the embodiment illustrated in FIGS. 11-12, data will be encrypted and/or compressed only at selected levels in the memory hierarchy, with different selected levels potentially specified for different pages of memory. As such, a substantial degree of flexibility may be provided for different applications. It will be appreciated, however, that level attributes need not be implemented in all implementations, and moreover, that level attributes need not be supported for both encryption and compression in implementations that support both functionalities.

Additional memory transactions may be supported in some embodiments consistent with the invention. For example, read modify write transactions may be used to encrypt and/or recompress an entire cache line whenever data in an encrypted or compressed cache line is updated.

Integrated Encryption Engine

As noted above, in some embodiments, an encryption engine may be integrated into a processing core to effectively provide a secure cache within the processing core, thereby providing further protection of secure data throughout the memory system. The aforementioned encryption-related page attributes may be used to access this secure cache to prevent secure data from ever leaving the processing core in an unencrypted form, such that the secure data is encrypted any time it is resident outside of the processing core. The integrated encryption engine is typically configured to perform encryption operations such as encryption and decryption.

In one embodiment, for example, a separate secure L1 cache may be provided along with a standard (non-secure) L1 cache, so that the secure L1 cache may be accessed in parallel with the standard cache and multiplexed into the pipeline after access. Upon a miss in the secure cache, a load may be sent to the next level of the memory system, e.g., an L2 cache. An encryption-related page attribute may be maintained in the load miss queue such that when the encrypted data is returned, it will be forwarded through the integrated encryption engine for decryption and into the secure cache, thereby ensuring that only an authorized, secure thread ever has access to the unencrypted data. In another embodiment, however, a separate secure L1 cache may not be used, whereby the integrated encryption engine may be used to selectively encrypt and decrypt data stored in the L1 cache based upon the encryption-related page attributes associated with that data.

Figure 13:
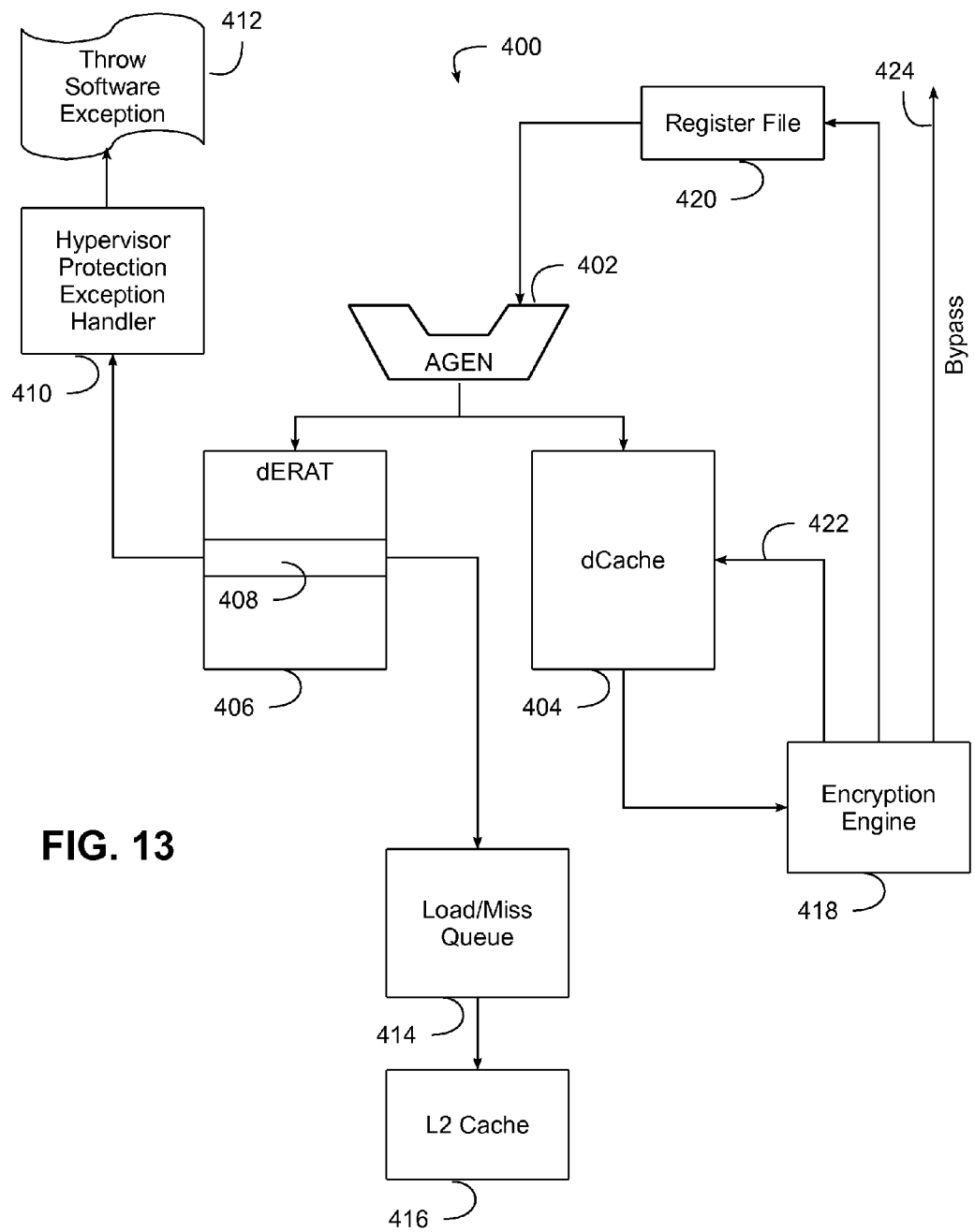
FIG. 13 is a block diagram illustrating an exemplary memory access using another data processing system incorporating an integrated encryption engine consistent with the invention.

FIG. 13, for example, illustrates an exemplary data processing system 400, and in particular, an exemplary processing core therein, for the purposes of illustrating an exemplary memory access that utilizes an integrated encryption engine consistent with the invention. Address generation logic 402, e.g., as provided in a load/store unit of a processing core, may generate a memory access request to access data (e.g., a cache line) from a particular page of memory, e.g., in response to an instruction executed by a hardware thread (not shown) executing in the processing core. The memory access request is issued to both an ERAT 406 and an L1 cache 404 in parallel, with the former determining whether the memory access request is authorized for the PID with which the requesting hardware thread is associated, and with the latter determining whether the cache line specified by the memory access request is currently cached in the L1 cache. In the illustrated embodiment of FIG. 13, ERAT 406 is designated a "dERAT" and L1 cache 404 is designated a "dCache" to indicate that these components are associated with data accesses, and that corresponding iERAT and iCache components may be provided to handle instruction accesses (not shown).

ERAT 406, in response to the memory access request, accesses a PTE 408 for the page of memory specified by the memory access request. Hypervisor protection exception handler logic 410 compares a PID for the memory access request with the access control bits in the PTE, and if an access violation occurs as a result of the PID not being authorized to access this page of memory, logic 410 signals an interrupt by throwing a software exception to the supervisor-level software, as represented at 412. In the event that a memory access request is authorized but a miss occurs on the L1 cache, the memory access request is forwarded to a load/miss queue 414, which issues the request to a lower level of memory, e.g., an L2 cache 416.

In addition, L1 cache 404 includes an encryption engine 418 coupled thereto and integrated into the processing core. Encryption engine 418 may be used, for example, to encrypt data being written out of the processing core, e.g., from L1 cache 404, or to decrypt data being used by the processing core and received from a lower level of memory or from the L1 cache. For example, encryption engine 418 may be configured to stream decrypted data to a register file 420, or to stream decrypted data back to L1 cache 404 via bus 422. In addition, encryption engine 418 may be coupled to a bypass network 424 to bypass register file 420 and provide decrypted data directly to an execution unit (not shown).

With the configuration shown in FIG. 13, a number of scenarios may be implemented. For example, L1 cache 404 may be used to store both encrypted and unencrypted data. Alternatively, L1 cache 404 may be a secure cache, with a separate L1 cache (not shown) utilized for storing non-secure data. Moreover, in some implementations L1 cache 404 may store decrypted data, such that encryption engine 418 is used to decrypt data received from lower levels of memory and encrypt data being written out to lower levels of memory. In the alternative, it particularly security-sensitive applications it may be desirable to maintain all secure data in encrypted form in L1 cache 404, whereby encryption engine 418 may be used to decrypt data being retrieved from L1 cache 404 into register file 420, and encrypt data being written back into L1 cache 404 from register file 420.

It may be desirable in some embodiments In association to set an indicator or attribute in an entry in load/miss queue that is associated with a memory access request for a secure page of memory. By doing so, when the requested data is returned, the indicator may be accessed to determine that the data is encrypted. Thus, for example, if two separate secure and non-secure L1 caches are provided in a processing core, the indicator may be used to route the return data to the appropriate L1 cache. Alternatively, if secure data is stored in an L1 cache in unencrypted format, the indicator may be used to cause the return data to be streamed through the encryption engine before being stored in the L1 cache.

Figure 14:
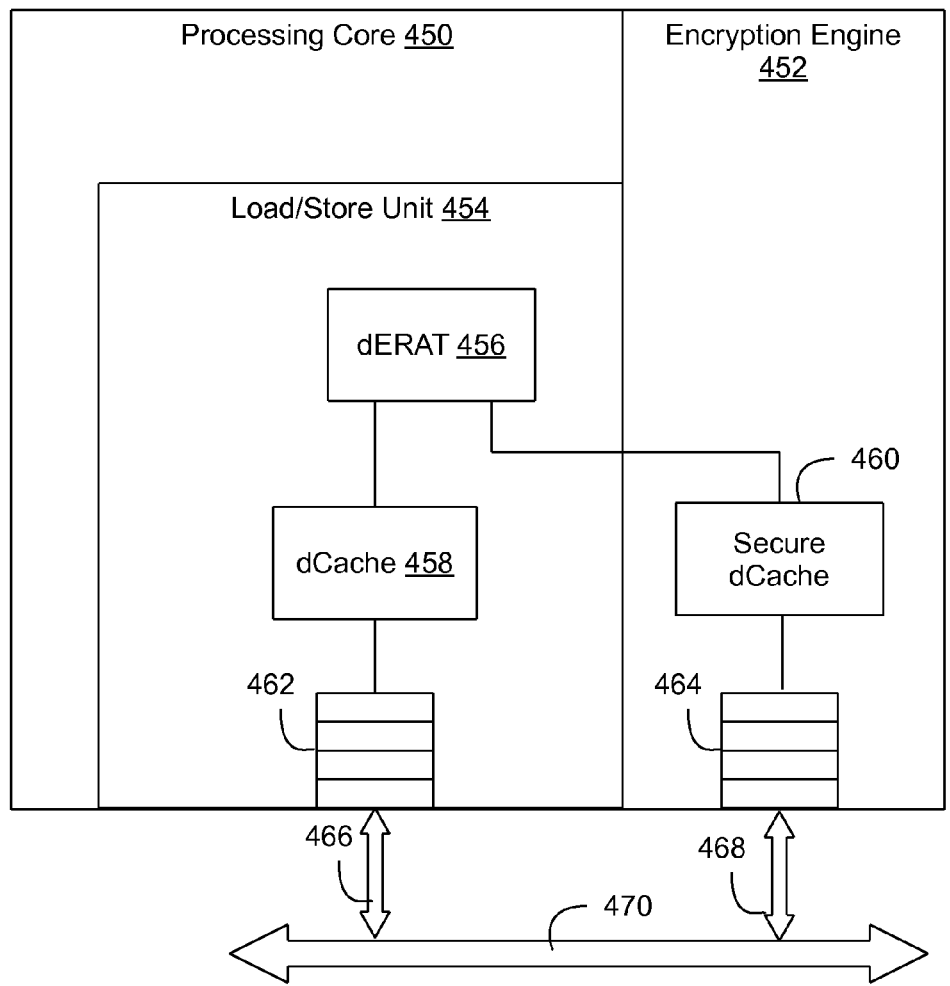
FIG. 14 is a block diagram another data processing system incorporating an integrated encryption engine consistent with the invention, and further incorporating a separate secure cache for use in storing secure data.

Next, turning to FIG. 14, as noted above, in some instances it may be desirable to employ separate secure and non-secure L1 caches in a processing core, e.g., so that non-secure data is not subject to the performance overhead associated with encrypting and decrypting data. Processing core 450, for example, incorporates an encryption engine 452 that is coupled to a load/store unit 454. An ERAT 456 in load/store unit 454 provides encryption-related and other page attributes to both a non-secure L1 cache 458 and secure L1 cache 460. Each L1 cache 458, 460 may have a separate load/miss queue 462, 464 and bus connections 466, 468 to a memory bus 470, or alternatively may share the same load/miss queue and bus connection.

Implementation of an integrated encryption engine may be vary in different embodiments. For example, an integrated encryption engine may be implemented in some embodiments as an AXU such as discussed above in connection with FIG. 4. The invention, however, is not limited to such an implementation.

Conclusion

Embodiments consistent with the invention provide a number of advantages over conventional designs. For example, the use of page attributes often eliminates the overhead that is otherwise required for a memory management unit to setup and manage memory regions or ranges of encrypted or compressed data. In addition, in the event that multiple processing cores are coupled to the same bus, other processing cores will typically not be able to access encrypted or compressed data for another processing core because the page attributes therefor are maintained within each processing core and restricted from access to only authorized processes.

Various modifications may also be made consistent with the invention. For example, as with an integrated encryption engine, it may be desirable to provide an integrated compression engine within a processing core, or other types of accelerator engines that are capable of utilizing page attributes to selectively processing data based thereon.

Other modifications may be made to the disclosed embodiments without departing from the spirit and scope of the invention. Therefore, the invention lies in the claims hereinafter appended.

What is claimed is:

1. A method of accessing data in a data processing system, the method comprising:
   in response to a memory access request initiated by a thread in a processing core, accessing a memory address translation data structure to perform a memory address translation for the memory access request;
   accessing an encryption-related page attribute in the memory address translation data structure to determine whether the memory page associated with the memory access request is encrypted, wherein the encryption-related page attribute comprises a level attribute that identifies at least one level of a multi-level memory architecture within which the memory page is encrypted; and
   selectively streaming secure data in the memory page through an encryption engine to perform an encryption operation on the secure data based upon whether the memory page associated with the memory access request is determined to be encrypted;
   wherein the memory access request comprises a first memory access request associated with a first process executed by the processing core, the method further comprising:
   in response to a second memory access request associated with a second process that is not authorized to access the memory page, asserting a software exception; and
   in response to the second memory access request, determining whether the memory page is encrypted, and when the memory page is encrypted, indicating that the page is encrypted when asserting the software exception.

2. The method of claim 1, wherein the memory address translation data structure includes a plurality of page table entries, each page table entry including a real address associated with the memory page associated with the page table entry and the encryption-related page attribute associated with such memory page.

3. The method of claim 1, further comprising, in response to a second memory access request initiated by a second thread, restricting access to the memory page by the second thread by comparing a process identifier associated with the second thread to access control data in the memory address translation data structure and denying access to the memory page by the second thread in response to the comparison.

4. The method of claim 1, further comprising in response to a third memory access request associated with a third process that is not authorized to access the memory page, determining whether the memory page is encrypted, and if so, performing a system shutdown.

5. The method of claim 1, wherein the encryption-related page attribute comprises an encrypted attribute that indicates whether the memory page is encrypted.

6. The method of claim 1, wherein selectively streaming secure data in the memory page through the encryption engine is based upon whether the level attribute indicates that the memory page is encrypted at a source or destination level for the memory access request.

7. The method of claim 1, wherein the encryption operation is selected from the group consisting of encrypting the secure data and decrypting the secure data.

8. A circuit arrangement, comprising:
a multi-core processor including a plurality of processing cores; and
a memory address translation data structure disposed in a first processing core among the plurality of processing cores, the memory address translation data structure configured to store address translation data for a memory page, wherein the memory address translation data structure is further configured to store an encryption-related page attribute for the memory page, wherein the encryption-related page attribute comprises a level attribute that identifies at least one level of a multi-level memory architecture within which the memory page is encrypted;
wherein the multi-core processor is configured to, in response to a memory access request initiated by a thread in the first processing core and associated with the memory page, selectively stream secure data from the memory page through an encryption engine to perform an encryption operation on the secure data based upon whether the memory page associated with the memory access request is encrypted, wherein the memory access request comprises a first memory access request associated with a first process executed by the processing core, and wherein the first processing core is configured to, in response to a second memory access request associated with a second process that is not authorized to access the memory page, determine whether the memory page is encrypted, and when the memory page is encrypted, indicate that the page is encrypted when asserting a software exception.

9. The circuit arrangement of claim 8, wherein the memory address translation data structure includes a plurality of page table entries, each page table entry including a real address associated with the memory page associated with the page table entry and the encryption-related page attribute associated with such memory page.

10. The circuit arrangement of claim 8, wherein the first processing core is configured to, in response to a third memory access request associated with a third process that is not authorized to access the memory page, determine whether the memory page is encrypted, and if so, perform a system shutdown.

11. The circuit arrangement of claim 8, wherein the multi-core processor is configured to selectively stream secure data in the memory page through the encryption engine based upon whether the level attribute indicates that the memory page is encrypted at a source or destination level for the memory access request.

12. The circuit arrangement of claim 8, wherein the encryption operation is selected from the group consisting of encrypting the secure data and decrypting the secure data.

13. A method of accessing data in a data processing system, the method comprising:
in response to a memory access request initiated by a thread in a processing core, accessing a memory address translation data structure to perform a memory address translation for the memory access request;
accessing an encryption-related page attribute in the memory address translation data structure to determine whether the memory page associated with the memory access request is encrypted; and
selectively streaming secure data in the memory page through an encryption engine to perform an encryption operation on the secure data based upon whether the memory page associated with the memory access request is determined to be encrypted;
wherein the memory access request comprises a first memory access request associated with a first process executed by the processing core, the method further comprising:
in response to a second memory access request associated with a second process that is not authorized to access the memory page, determining whether the memory page is encrypted, and when the memory page is encrypted if so, performing a system shutdown.

14. A circuit arrangement, comprising:
a multi-core processor including a plurality of processing cores; and
a memory address translation data structure disposed in a first processing core among the plurality of processing cores, the memory address translation data structure configured to store address translation data for a memory page, wherein the memory address translation data structure is further configured to store an encryption-related page attribute for the memory page;
wherein the multi-core processor is configured to, in response to a memory access request initiated by a thread in the first processing core and associated with the memory page, selectively stream secure data from the memory page through an encryption engine to perform an encryption operation on the secure data based upon whether the memory page associated with the memory access request is encrypted, wherein the memory access request comprises a first memory access request associated with a first process executed by the processing core, and wherein the first processing core is configured to, in response to a second memory access request associated with a second process that is not authorized to access the memory page, determine whether the memory page is encrypted, and when the memory page is encrypted, perform a system shutdown.

15. The method of claim 1, further comprising:
in response to a third memory access request, accessing the memory address translation data structure to perform a memory address translation for the third memory access request;
accessing a compression-related page attribute in the memory address translation data structure to determine whether a second memory page associated with the third memory access request is compressed; and
selectively streaming data in the second memory page through a compression engine to perform a compression operation on the data based upon whether the second memory page associated with the third memory access request is determined to be compressed.

16. The method of claim 15, wherein each page table entry in the memory address translation data structure further includes a compression-related page attribute.

17. The method of claim 15, wherein the compression-related page attribute comprises a compression-related level attribute that identifies at least one level of the multi-level memory architecture within which the second memory page is compressed, and wherein selectively streaming data in the second memory page through the compression engine is based upon whether the compression-related level attribute indicates that the second memory page is compressed at a source or destination level for the third memory access request.

18. The method of claim 15, wherein the compression operation is selected from the group consisting of compressing the data and decompressing the data.

19. The circuit arrangement of claim 8, wherein the multi-core processor is further configured to:
    in response to a third memory access request, access the memory address translation data structure to perform a memory address translation for the third memory access request;
    access a compression-related page attribute in the memory address translation data structure to determine whether a second memory page associated with the third memory access request is compressed; and
    selectively stream data in the second memory page through a compression engine to perform a compression operation on the data based upon whether the second memory page associated with the third memory access request is determined to be compressed.

20. The method of claim 19, wherein each page table entry in the memory address translation data structure further includes a compression-related page attribute.

21. The method of claim 19, wherein the compression-related page attribute comprises a compression-related level attribute that identifies at least one level of the multi-level memory architecture within which the second memory page is compressed, and wherein the multi-core processor is configured to selectively stream data in the second memory page through the compression engine based upon whether the compression-related level attribute indicates that the second memory page is compressed at a source or destination level for the third memory access request.

22. The method of claim 19, wherein the compression operation is selected from the group consisting of compressing the data and decompressing the data.

\* \* \* \* \*